Patented June 20, 1950

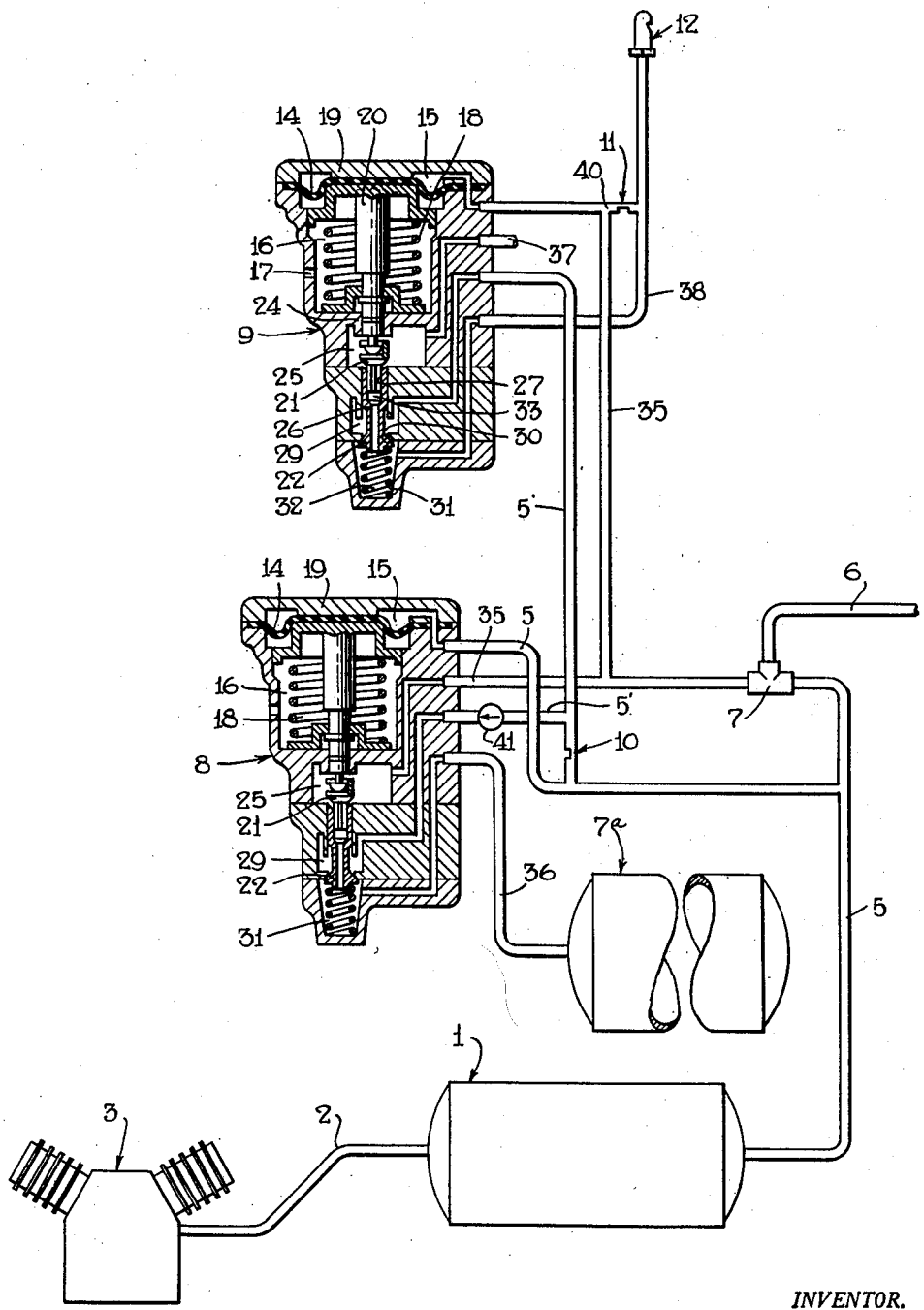

2,512,043

UNITED STATES PATENT OFFICE 2,512,043

FLUID PRESSURE CONTROL APPARATUS

Roy R. Stevens, Forest Hills, Pa., assignor to The Westinghouse Air Brake Company, Wilmerding, Pa., a corporation of Pennsylvania Application May 26, 1948, Serial No. 29,243

5 Claims. (Cl. 303—85)

This invention relates to control apparatus and more particularly to the fluid pressure type.

In certain types of control systems dependent upon fluid under pressure for their operation it may be essential that supply of said fluid under pressure does not fail during operation, and the principal object of the invention is the provision of improved safety means for ensuring this result.

According to this object, I associate with a normal source of supply of fluid under pressure and a fluid pressure delivery pipe, a reserve or emergency reservoir for storing fluid under pressure and means automatically operative to control charging of the emergency reservoir with fluid under pressure from the normal source and release of fluid under pressure from said reservoir to the delivery pipe in case of failure of the normal source. I further provide audible signal means in the form of a whistle for indicating failure of pressure in the normal source and means automatically operative to control operation of the whistle.

Other objects and advantages will be apparent from the following more detailed description of the invention.

In the accompanying drawing, the single figure is a diagrammatic view, partly in section and partly in outline, of a control apparatus embodying the invention.

Description

As shown in the drawing, the apparatus comprises a normal fluid pressure supply reservoir 1 adapted to be charged with fluid under pressure through a pipe 2 by operation of a compressor 3. Fluid under pressure is taken from reservoir 1 through a fluid pressure supply pipe 5 to a fluid pressure delivery pipe 6, via a double check valve device 7, to furnish normal supply of fluid under pressure from reservoir 1 to any apparatus or controls utilizing fluid under pressure.

According to the invention, the apparatus further comprises a reserve or emergency reservoir 7a, two relay valve devices 8, 9 of identical structure, two chokes 10, 11, an audible signal device in the form of a whistle 12 and a check valve device 41.

The relay valve devices 8, 9 each comprises a casing in which is clamped a diaphragm 14. At one side of diaphragm 14 there is a control pressure chamber 15 adapted to be supplied with fluid under pressure for urging said diaphragm to deflect in the direction of a chamber 16 at its opposite side. Chamber 16 is open to atmosphere by way of a port 17 in the casing. A control spring 18 is disposed in chamber 16 adapted and arranged to urge diaphragm 14 in the direction of control chamber 15 toward its rest position in contact with a shoulder 19 formed in the casing, in which position it is shown in the drawing. A stem 20 is secured for reciprocable movement with deflection of diaphragm 14 for actuating valves 21, 22. Stem 20 projects through chamber 16 and is slidably guided in a bore opening through a partition 24 which divides chamber 16 from a chamber 25. The projecting end of stem 20 has an operating connection with valve 21 which is disposed in the chamber 25. By reciprocable movement of stem 20, valve 21 is brought into and out of seating engagement with a hollow cylindrical seat element 26 which is slidably mounted in a bore 27 extending through a partition which separates the chamber 25 from a chamber 29. Seat element 26 extends through the chamber 29 and through an opening 30 in a partition separating said chamber from a chamber 31. The valve 22 disposed in the chamber 31 is attached to the end of stem 26 and arranged to cooperate with a seat formed at one end of opening 30 to control communication therethrough between said chamber and the chamber 29. A bias spring 32 is arranged to urge valve 22 to a seated position. A central opening 33 extends longitudinally through seat element 26, which, when valve 21 is unseated, connects the chamber 25 to the chamber 31. When valve 21 is seated, opening 33 is closed.

When fluid under pressure is supplied to the control chamber 15, through consequent deflection of diaphragm 14 and thereby movement of stem 20, valve 21 is brought into seating engagement with element 26 which is then moved to unseat the attached valve 22. At this time chamber 25 is closed to chamber 31 and the latter chamber is open to chamber 29.

When pressure of fluid is released from control chamber 15, the relay valve devices will again assume their position in which they are shown in the drawing with valve 22 seated and valve 21 unseated. At this time chamber 25 is open to chamber 31 and the latter chamber is closed to chamber 29.

In relay valve device 8, the control chamber 15 is connected to the supply pipe 5, and the chamber 25 is connected via a pipe 35 to double check valve device 7 through which it is adapted to be connected to the delivery pipe 6. The pipe 35 is also connected to control chamber 15 of relay valve device 9. Chamber 29 is connected to the pipe 5 via a pipe 5' and thereby to the corresponding chamber 29 in relay valve device 9, and chamber 31 is connected by way of a pipe 36 to the emergency reservoir 7a.

In relay valve device 9, chamber 25 is connected via a pipe 37 to atmosphere and chamber 31 is connected by way of a pipe 38 to the whistle 12.

Choke 10 is inserted in the pipe 5' and the choke 11, which offers more resistance to flow than does the choke 10, is inserted in a pipe 40 connecting pipe 35 with the pipe 38.

The check valve 41 is inserted in the communication between the normal supply pipe 5 and the emergency reservoir 7a to permit flow of fluid under pressure from the former to the latter but to prevent flow in the reverse direction. The check valve 41 is shown disposed in the pipe 5' between the valve device 8 and the normal supply pipe 5 to accomplish the intended purpose.

*Operation*

In operation, assume initially that the whole apparatus is at atmospheric pressure, under which condition the diaphragms 14 in relay valve devices 8, 9 will be seated on the respective shoulders 19, and in both devices valve 22 will be seated and valve 21 unseated. Communication between supply pipe 5 via choke 10 and pipe 5', and the pipes 35 and 38, through the relay valve device 8 and 9, respectively, will be closed. Communication between pipes 35, 36 through valve device 8 will be open, and communication between the pipes 37, 38 through the valve device 9 will be open.

If now the compressor 3 is operated to effect supply of fluid under pressure to the normal supply reservoir 1, fluid under pressure will flow therefrom through the pipe 5 and the double check valve 7 to the delivery pipe 6, available for use.

Fluid under pressure supplied to pipe 5 at the same time will also flow into the control chamber 15 of the relay valve device 8 which will respond to establish communication therethrough between the pipes 5' and 36, whereupon fluid under pressure from supply pipe 5 will flow through choke 10, pipe 5', check valve 41, relay valve device 8 and pipe 36 to the emergency reservoir 7a which is thereby charged with fluid at a pressure which will increase substantially with that obtained in the normal supply reservoir. With sufficient lapse of time said pressure in the emergency reservoir will reach the maximum pressure attainable in the normal supply reservoir 1 and will be prevented from subsequent reduction with reduction in pressure in said reservoir 1 by action of the check valve 41 which will prevent such reduction from occurring.

During this time pipe 38 connected to the whistle 12 will remain connected to the atmosphere via communication through relay valve device 9 and the pipe 37.

If fluid under pressure is now used from the delivery pipe 6, the pressure of fluid in the pipe 5 will tend to reduce, but normally will be maintained or restored by flow of fluid under pressure from the normal supply reservoir 1 and compressor 3.

However, if, due to excessive use of fluid under pressure from pipe 5 and reservoir 1, or due to failure of compressor 3, or due to excessive leakage of fluid under pressure from the normal supply source, the pressure in pipe 5 should become reduced below a certain minimum pressure considered to be adequate for supply to delivery pipe 6, such reduced pressure, in control chamber 15 in relay valve device 8 will allow spring 18 to actuate diaphragm 14 to open valve 21 and close valve 22 and thereby establish communication between pipe 36, connected to the emergency reservoir, and the pipe 35, connected to the double check valve device 7, and to disestablish communication between the pipe 5', connected to pipe 5, and the pipe 36.

Fluid under pressure from the emergency reservoir 7a will then flow through pipe 36, relay valve device 8, pipe 35, and through the double check valve device 7 into the delivery pipe 6 to assure adequate supply thereto and thereby prevent its undesired reduction with the accidental reduction in pressure of fluid in the normal supply reservoir 1.

Fluid under pressure thus supplied to pipe 35 will at the same time flow to the control chamber 15 in the relay valve device 9 and, due to choke 11, will cause sufficient pressure to promptly develop in said chamber to actuate said device to establish communication between pipes 5' and 38 and to disestablish communication between said pipe 38 and the pipe 37.

Fluid under pressure thus supplied to the pipe 38 flows to the whistle 12 for sounding same. The sound of the whistle 12 affords an audible signal which warns an operator of apparatus utilizing fluid under pressure from the delivery pipe 6 that supply of fluid under pressure from the normal supply reservoir 1 has failed and that the emergency supply has been cut in, thus enabling said operator to employ the emergency supply with discretion until normal supply is restored. It will be appreciated that such audible signal is operated automatically and at the same time that the emergency reservoir 7a is connected via pipe 35 to the delivery pipe 6.

When fluid in the normal supply reservoir 1 is reestablished at or above the aforementioned tolerable minimum pressure, such pressure in the control chamber 15 in the relay valve device 8 will cause same to again disestablish communication between pipes 35, 36 and to establish communication between the latter of these pipes and the pipe 5' for cutting off supply of fluid under pressure from the emergency reservoir 7a to delivery pipe 6 and for recharging said reservoir with fluid under pressure from the supply pipe 5. Pressure of fluid in the control chamber 15 in the relay valve device 9 will then leak off through pipe 35, pipe 40 via the small choke 11, the pipe 38 and the whistle 12. When pressure of fluid in chamber 15 in valve device 9 is thus reduced sufficiently, said device will respond to disestablish communication between pipes 5' and 38 and to establish communication between the latter pipe and the pipe 37 to the atmosphere. The whistle 12 then stops sounding, in absence of supply of fluid under pressure thereto from the pipe 5'.

*Summary*

It will be seen now that I have provided improved fluid pressure control apparatus automatically operative for assuring adequate supply of fluid under pressure to a fluid pressure delivery pipe in event that supply of fluid under pressure to said pipe from a normal fluid pressure source fails. I further provide improved means operative automatically to effect an audible signal for warning an operator that such condition exists.

Having now described my invention, what I claim as new and desire to secure by Letters Patent, is:

1. In a control apparatus, the combination with a fluid pressure supply pipe, a fluid pressure reservoir, a fluid pressure delivery pipe, a first fluid pressure communication between said fluid pressure supply pipe and said fluid pressure delivery pipe, a second fluid pressure communication between said supply pipe and said reservoir and a third fluid pressure communication between said reservoir and said delivery pipe, of a relay valve device operable by pressure of fluid in said supply pipe at or above a chosen value to close said third fluid pressure communication and to open said second fluid pressure communication and operable upon a reduction in said pressure below said chosen value to close said second fluid pressure communication and to open said third fluid pressure communication, and double check valve means operable to disestablish connection between either of the first and third fluid pressure communications and said delivery pipe upon preponderance in pressure of fluid in the other of said communication.

2. In a control apparatus, the combination with a fluid pressure supply pipe, a fluid pressure reservoir, a fluid pressure delivery pipe, a first fluid pressure communication between said fluid pressure supply pipe and said fluid pressure delivery pipe, a second fluid pressure communication between said supply pipe and said reservoir and a third fluid pressure communication between said reservoir and said delivery pipe, of a relay valve device operable by pressure of fluid in said supply pipe at or above a chosen value to close said third fluid pressure communication and to open said second fluid pressure communication and operable upon a reduction in said pressure below said chosen value to close said second fluid pressure communication and to open said third fluid pressure communication, double check valve means operable to disestablish connection between either of the first and third fluid pressure communications and said delivery pipe upon preponderance in pressure of fluid in the other of said communications, and choke means disposed in said second fluid pressure communication.

3. In a control apparatus, the combination with a fluid pressure supply pipe, a fluid pressure reservoir, a fluid pressure delivery pipe, a first fluid pressure communication between said fluid pressure supply pipe and said fluid pressure delivery pipe, a second fluid pressure communication between said supply pipe and said reservoir and a third fluid pressure communication between said reservoir and said delivery pipe, of a relay valve device operable by pressure of fluid in said supply pipe at or above a chosen value to close said third fluid pressure communication and to open said second fluid pressure communication and operable upon a reduction in said pressure below said chosen value to close said second fluid pressure communication and to open said third fluid pressure communication, double check valve means operable to disestablish connection between either of the first and third fluid pressure communications and said delivery pipe upon preponderance in pressure of fluid in the other of said communications, a fluid pressure conduit, second relay valve means operable by pressure of fluid supplied to said third fluid pressure communication to effect supply of fluid under pressure from said supply pipe to said conduit, and fluid pressure operable signal means connected to said conduit.

4. In a control apparatus, the combination with a fluid pressure supply pipe, a fluid pressure reservoir, a fluid pressure delivery pipe, a first fluid pressure communication between said fluid pressure supply pipe and said fluid pressure delivery pipe, a second fluid pressure communication between said supply pipe and said reservoir and a third fluid pressure communication beween said reservoir and said delivery pipe, of a relay valve device operable by pressure of fluid in said supply pipe at or above a chosen value to close said third pressure communication and to open said second fluid pressure communication and operable upon a reduction in said pressure below said chosen value to close said second fluid pressure communication and to open said third fluid pressure communication, double check valve means operable to disestablish connection between either of the first and third fluid pressure communications and said delivery pipe upon preponderance in pressure of fluid in the other of said communications, a fluid pressure conduit, second relay valve means operable by pressure of fluid supplied to said third fluid pressure communication to effect supply of fluid under pressure from said supply pipe to said conduit, fluid pressure operable signal means connected to said conduit, and choke means connecting said conduit with said third fluid pressure communication.

5. In a control apparatus, the combination with a fluid pressure supply pipe, a fluid pressure reservoir, a fluid pressure delivery pipe, a first fluid pressure communication between said fluid pressure supply pipe and said fluid pressure delivery pipe, a second fluid pressure communication between said supply pipe and said reservoir and a third fluid pressure communication between said reservoir and said delivery pipe, of a relay valve device operable by pressure of fluid in said supply pipe at or above a chosen value to close said third fluid pressure communication and to open said second fluid pressure communication and operable upon a reduction in said pressure below said chosen value to close said second fluid pressure communication and to open said third fluid pressure communication, double check valve means operable to disestablish connection between either of the first and third fluid pressure communications and said delivery pipe upon proponderance in pressure of fluid in the other of said communications, choke means disposed in said second fluid pressure communication, a fluid pressure conduit, second relay valve means operable by pressure of fluid supplied to said third fluid pressure communication to effect supply of fluid under pressure from said supply pipe to said conduit, fluid pressure operable signal means connected to said conduit, and second choke means connecting said conduit with said third fluid pressure communication, said second choke means being of lesser capacity than the first-named choke means.

ROY R. STEVENS.

REFERENCES CITED

The following references are of record in the file of this patent:

UNITED STATES PATENTS

| Number | Name | Date |
|---|---|---|
| 1,469,585 | McCune | Oct. 2, 1923 |
| 2,379,308 | McClure | June 26, 1945 |